(12) United States Patent
Jagmag et al.

(10) Patent No.: US 9,076,001 B1
(45) Date of Patent: Jul. 7, 2015

(54) METHOD AND APPARATUS FOR IMPLEMENTING A SECURE CONTENT PIPELINE

(71) Applicant: MARVELL INTERNATIONAL LTD., Hamilton (BM)

(72) Inventors: Adil Jagmag, Hollis, NH (US); Geng Yang, Bellevue, WA (US)

(73) Assignee: Marvell International Ltd. (BM)

( * ) Notice: Subject to any disclaimer, the term of this patent is extended or adjusted under 35 U.S.C. 154(b) by 140 days.

(21) Appl. No.: 13/755,029

(22) Filed: Jan. 31, 2013

Related U.S. Application Data

(60) Provisional application No. 61/595,549, filed on Feb. 6, 2012.

(51) Int. Cl.
*G06F 11/30* (2006.01)
*G06F 21/60* (2013.01)
(52) U.S. Cl.
CPC .............. *G06F 21/602* (2013.01); *G06F 21/60* (2013.01)

(58) Field of Classification Search
CPC ............................... G06F 21/602; G06F 21/60
USPC .......................................................... 713/193
See application file for complete search history.

(56) References Cited

U.S. PATENT DOCUMENTS

| 2005/0138402 | A1* | 6/2005 | Yoon et al. ..................... 713/193 |
| 2006/0259431 | A1* | 11/2006 | Poisner ........................... 705/51 |
| 2010/0077472 | A1* | 3/2010 | Kaabouch et al. ............... 726/16 |

* cited by examiner

*Primary Examiner* — Mohammad W Reza

(57) ABSTRACT

Systems, methods, and other embodiments associated with implementing a secure content pipeline are described. According to one embodiment, an apparatus includes a first processor, write-only memory, and unsecure memory. The write-only memory is accessible to the first processor for writing data, wherein the write-only memory is not accessible to the first processor for reading data. The unsecure memory is accessible to the first processor for writing and reading data. According to another embodiment, a method includes receiving data to be written to a write-only memory from a first processor; writing the data to the write-only memory; and preventing read access to the write-only memory by the first processor.

17 Claims, 5 Drawing Sheets

METHOD AND APPARATUS FOR IMPLEMENTING A SECURE CONTENT PIPELINE

CROSS REFERENCE TO RELATED APPLICATIONS

This patent disclosure claims the benefit of U.S. provisional application Ser. No. 61/595,549 filed on Feb. 6, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Some processor systems include both secure processors and unsecure processors. The secure processors are configured to run software only from approved sources (e.g., bearing a signature of an approved source), while the unsecure processors (e.g., application processors) are configured to run software regardless of the software's source. The secure processors handle security related processing such as encryption/decryption functions. The secure processors have access to keys that are used to perform the encryption/decryption operations. Computing systems that include secure processors also include secure memory that is accessible only by the secure processors. This secure memory is isolated from unsecure memory that is accessible to all processors (e.g., both secure processors and unsecure processors).

SUMMARY

In general, in one aspect this specification discloses an apparatus for implementing a secure content pipeline. The apparatus includes a first processor, write-only memory, and unsecure memory. The write-only memory is accessible to the first processor for writing data, wherein the write-only memory is not accessible to the first processor for reading data. The unsecure memory is accessible to the first processor for writing and reading data.

In general, in another aspect, this specification discloses a method for implementing a secure content pipeline. The method includes receiving data to be written to a write-only memory from a first processor; writing the data to the write-only memory; and preventing read access to the write-only memory by the first processor.

In general, in another aspect, this specification discloses a device for implementing a secure content pipeline. The device includes write-only memory, an application processor, a secure processor, and a memory controller. The application processor is configured to i) download encrypted digital content from a source and ii) store the encrypted digital content in write-only memory. The secure processor is configured to i) read the encrypted digital content from the write-only memory and ii) decrypt the encrypted digital content to produce decrypted digital content. The memory controller is configured to i) allow the application processor to write encrypted digital content to the write-only memory, ii) prevent the application processor from reading data from the write-only memory, and iii) allow the secure processor to read the encrypted digital content from the write-only memory.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

When encrypted digital content (e.g., audio visual content) is downloaded by an application processor for pipelining, the application processor stores the encrypted content in memory for decryption by a secure processor. Since the application processor is an unsecure processor, the application processor is not given access to secure memory. Therefore the application processor stores the encrypted content in unsecure memory that is read/write accessible to all processors. Storing encrypted content in unsecure memory that is accessible to other application processors is deemed acceptable from a security standpoint because although other application processors can access the encrypted content, the other application processors cannot decrypt the content.

The secure processor that performs the pipelining reads the encrypted content and decrypts the encrypted content with a key that was provided by a source of the encrypted content. The secure processor stores the resulting decrypted content in secure memory that is read/write accessible only to the secure processor. Since unsecure application processors cannot access the secure memory to read the decrypted content, the decrypted data is protected from unauthorized access.

In the above described pipelining technique the content is stored in two places: the unsecure memory and the secure memory. The secure memory is configured to have sufficient size to store the decrypted content. The amount of secure memory used by the secure processor when content pipelining is not being performed is much less than the amount of secure memory that is used during content pipelining to store decrypted content. This means that the size of the secure memory is significantly larger than it needs to be for non-pipelining operations. Further, the transfer of the content from the unsecure memory to the secure memory is a complex operation that involves synchronization and buffering of the content as the content is transferred.

Described herein are examples of systems, methods, and other embodiments that provide a secure content pipeline utilizing "write-only" memory that is write accessible to unsecure processors. The write-only memory cannot be read by unsecure processors. The write-only memory is read and write accessible to the secure processor. Digital content is downloaded by an unsecure processor to the write-only memory, where it can be decrypted "in place" by the secure processor, allowing the size of the secure memory to be reduced and simplifying content pipelining. In this description, the write-only memory will be described in the context of content pipelining. However, the write-only memory described herein may be used in any of a number of contexts in which data is stored by a first processor and subsequently processed by a second processor to produce resulting data that should not be readable by the first processor.

Figure 1:
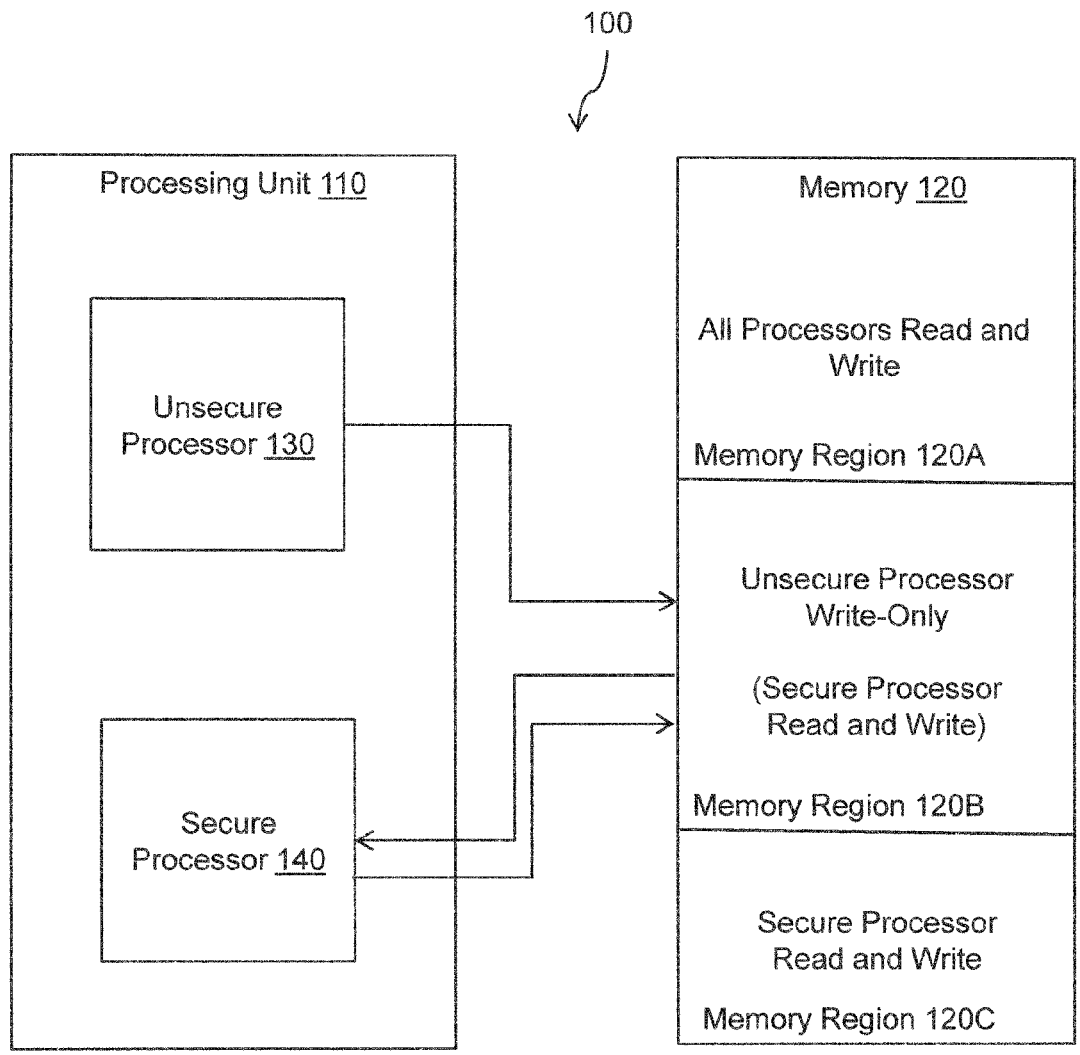
FIG. 1 illustrates one embodiment of an apparatus associated with a secure content pipeline.

With reference to FIG. 1, one embodiment of an apparatus 100 is shown that is associated with a secure content pipeline. The apparatus 100 includes a processing unit 110 and a memory 120. The apparatus 100 may be embodied on a system-on-chip SOC that includes the processing unit 110 and the memory 120. The processing unit 110 includes an unsecure processor 130 and a secure processor 140. In some embodiments, unsecure processor is one processing core out of multiple processing cores and/or is an instance of a virtual processor. The secure processor 140 may be a separate processing core or an instance of a virtual processor running on a processing core that also provides the unsecure processor 130. While a single unsecure processor 130 and a single secure processor 140 are shown in FIG. 1, any number of unsecure and secure processors may be included in the processing unit 110.

The unsecure processor 130 is a processor that runs software without regard for whether the software is from a trusted source. Examples of unsecure processors include application processors configured to run software that is installed by a user of the apparatus 100. The secure processor 140 is a processor that only runs software from a trusted source. The secure processor 140 runs software that performs security-related operations. In some embodiments, the secure processors 140 run software that processes Personal Identification Numbers (PINs), decrypts premium digital content (e.g., paid or licensed A/V content), accesses cloud based documents, and so on.

The secure processors 140 have access to security keys that are saved in protected memory (not shown) during chip production, while unsecure processors do not. The secure processor 140 may confirm that software is from a trusted source by checking a signature of software that is accessing the processor using a security key. The secure processor 140 may confirm that software from a trusted source has not been modified using a security key. The secure processor 140 may also use a security key to decrypt media content encrypted that is downloaded by an application processor.

The memory 120 may be volatile, non-volatile, or a combination of volatile and non-volatile memory. The memory 120 is segmented into three regions unsecure memory 120A, write-only memory 120B, and secure memory 120C. Unsecure memory 120A is analogous to the unsecure memory described above that is read and write accessible by all processors, including the secure processor 140 and the unsecure processor 130. Secure memory 120C is analogous to the secure memory described above that is read and write accessible only to the secure processor 140. The secure content pipeline described above includes unsecure memory and secure memory.

Write-only memory 120B is write-only with respect to the unsecure processor 130. Thus, an unsecure processor is allowed to write or store data in the memory region 120B, however, an unsecure processor is not allowed to read data in the memory region 120B. The secure processor 140 may read and write data in the write-only memory 120B. The secure content pipeline described above does not include the write-only memory 120B. For the purposes of this description, the term "write-only memory" will be used to designate memory that is write-only with respect to at least one processor, while being both read and write accessible to at least one other processor. In some embodiments, write-only memory is a segmented portion of memory to which clients deemed "unsecure" are granted write-only permission.

The unsecure processor 130 stores data that requires a security-related operation in the write-only memory 120B. The secure processor 140 reads the data in the write-only memory 120B and performs the security related operation. For example, the secure processor may decrypt encrypted premium digital content. The secure processor 140 stores the result of the security-related operation, (e.g., the decrypted digital content) in the write-only memory 120B. Because the unsecure processor 130 cannot read data in the write-only memory 120B, the result of the security-related operation is protected from unauthorized access. Only a secure processor may read the result of the security-related operation in the write-only memory 120B. Using the write-only memory 120B to store both data that is provided by an unsecure processor and the results of security-related processing on the data eliminates the need to store the data in the unsecure memory and then copy the data to the secure memory. This simplifies the performance of security-related operations and allows the size of the secure memory to be reduced.

Figure 2:
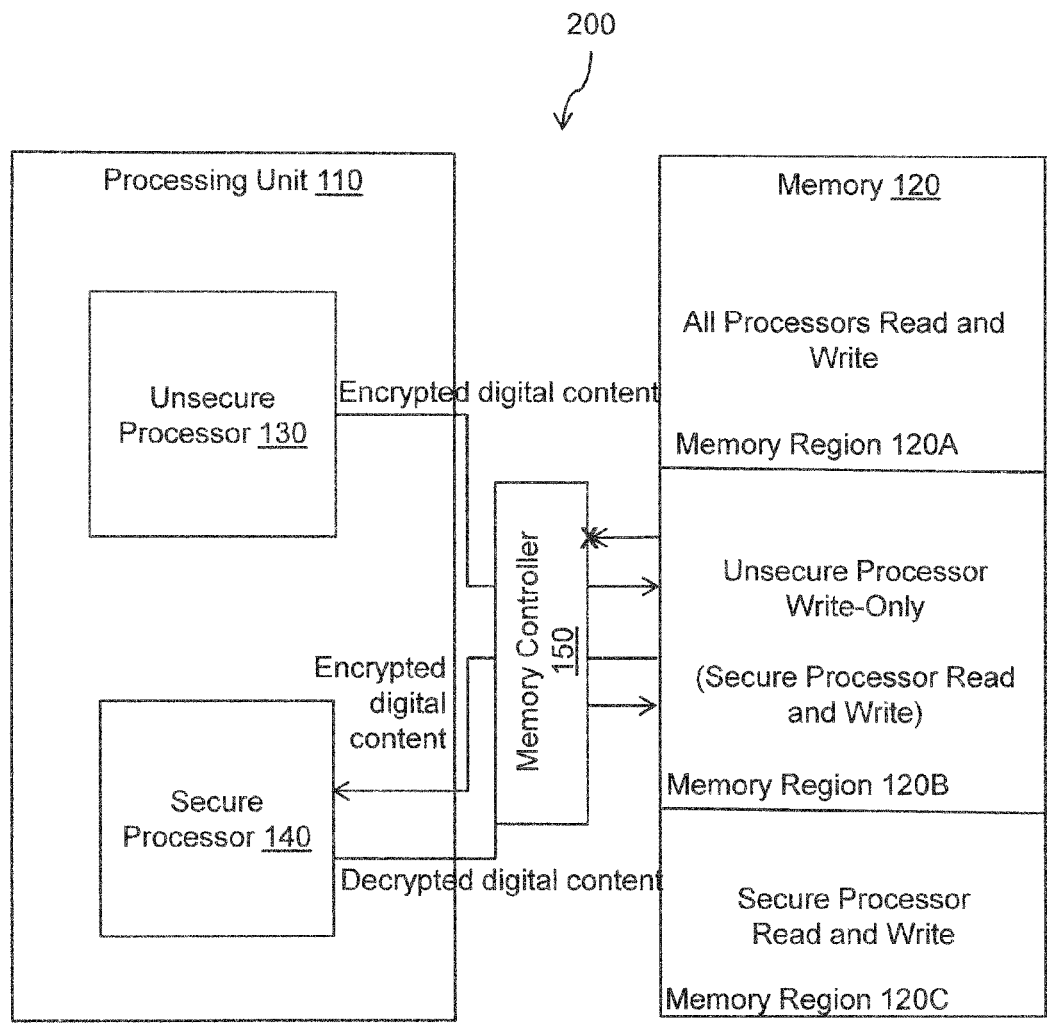
FIG. 2 illustrates one embodiment of an apparatus associated with a secure content pipeline.

With reference to FIG. 2, one embodiment of an apparatus 200 is shown that is associated with a secure content pipeline. The apparatus includes the processing unit 110 and the memory 120 shown in FIG. 1. The apparatus also includes a memory controller 150. The memory controller 150 allocates specific address lines in the memory 120 as being part of the unsecure memory 120A, the write-only memory 120B, or the secure memory 120C. The memory controller 150 controls access to the memory 120 by processors in the processing unit 110. The memory controller 150 identifies each "client" (e.g., a secure processor or an unsecure processor) that requests access to the memory 120. The memory controller 150 controls access to the memory 120 by each client in accordance with the secure/unsecure designation for each client.

In one embodiment, client processors are designated as secure or unsecure during configuration of the memory controller 150. The configuration of the memory controller 150 has security controls so that an unsecure processor may not change the configuration of the memory controller 150. Thus, an unsecure processor is prevented from changing its unsecure designation to a secure designation.

When the memory controller 150 receives a request from an unsecure processor to write data to an address line that has been allocated to the write-only memory 120B, the memory controller 150 grants the request and stores the data in the write-only memory 120B. When the memory controller 150 receives a request from an unsecure processor to read data in the write-only memory 120B, the memory controller 150 denies the request. The memory controller 150 allows requests for access to the unsecure memory 120A to all identified clients. The memory controller 150 allows requests from secure processor clients to the secure memory 120C. The memory controller 150 denies access to the secure memory 120C to unsecure processor clients.

When the apparatus 200 is used to provide a secure content pipeline, the unsecure processor 130 downloads encrypted digital content, such as a song or movie. The unsecure processor 130 requests access to the write-only memory 120B from the memory controller 150. The memory controller 150 grants the request and the encrypted digital content is stored in the write-only memory 120B. Any request by the unsecure processor 130 to read data in the write-only memory 120B is denied by the memory controller 150.

The secure processor 140 requests access to the write-only memory 120B from the memory controller 150. The memory controller 150 grants the request and the encrypted digital content is read from the write-only memory 120B. The secure processor 140 decrypts the digital content and requests access to the write-only memory 120B to store the resulting decrypted content. The memory controller 150 grants the request and the decrypted digital content is stored in the write-only memory 120B. The decrypted digital content is protected by the memory controller 150 and cannot be accessed by the unsecure processor 140. The decrypted digital content is provided to a secure decoder (not shown) to decode and stream the content to a user.

Figure 3:
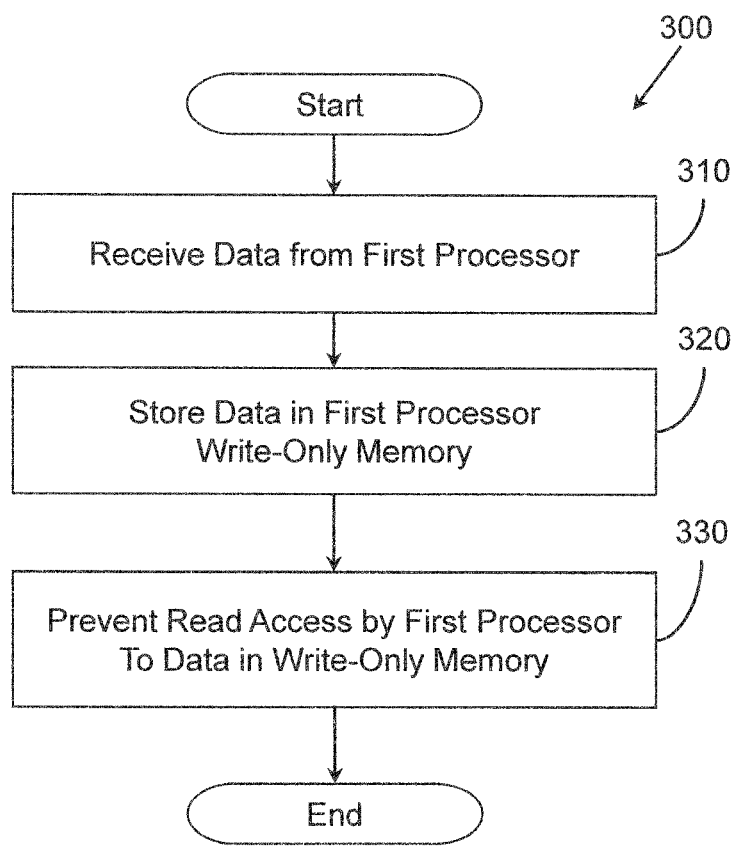
FIG. 3 illustrates one embodiment of a method associated with a secure content pipeline.

With reference to FIG. 3, one embodiment of a method 300 is shown that is associated with a secure content pipeline. The method 300 may be performed by the memory controller 150 of FIG. 2. The method includes, at 310, receiving data to be written to a write-only memory from a first processor. The method includes, at 320, writing the data to the write-only memory. The method includes, at 330, preventing read access by the first processor to the data in the write-only memory. In one embodiment, the first processor is an unsecure processor configured to run software regardless of a source of the software.

Figure 4:
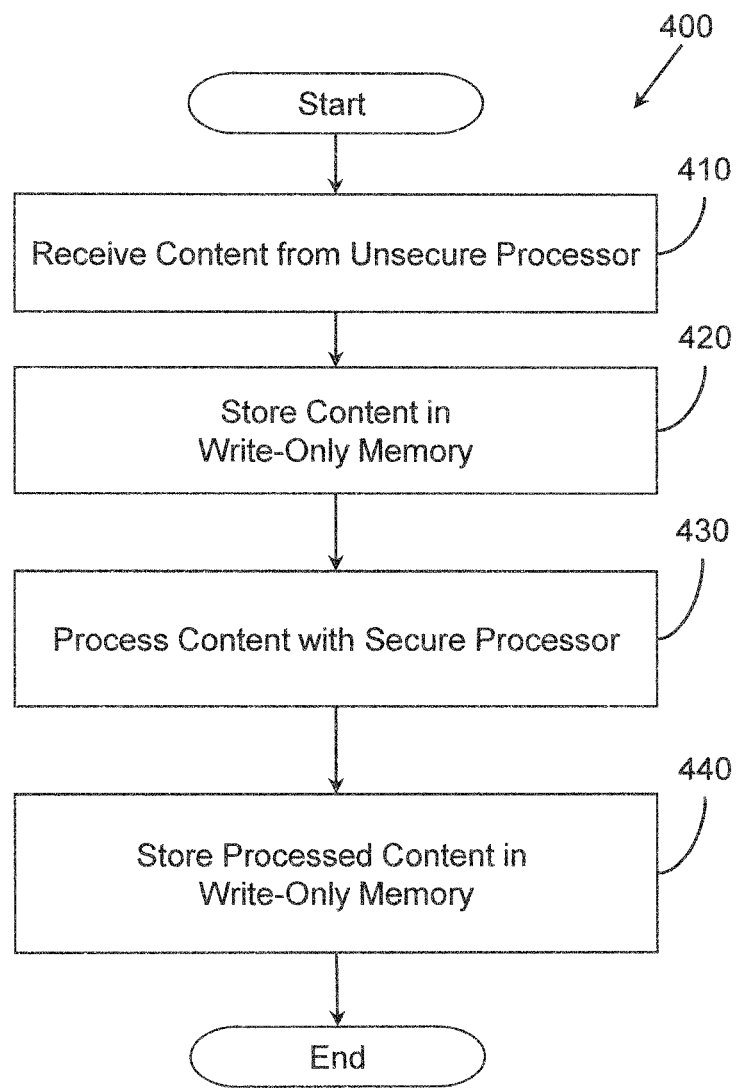
FIG. 4 illustrates one embodiment of a method associated with a secure content pipeline.

With reference to FIG. 4, one embodiment of a method 400 is shown that is associated with a secure content pipeline. The method 400 may be performed by the apparatus 100 of FIG. 1 or the apparatus 200 of FIG. 2. The method includes, at 410, receiving content to be written to a write-only memory from an unsecure processor. The method includes, at 420, writing the content to the write-only memory. The method includes, at 430, processing the content by performing a security-related operation with a secure processor. The method includes, at 440 storing processed content in the write-only memory. In one embodiment, the secure processor is configured to run software from a trusted source and not run software that is not from a trusted source. In one embodiment, the secure processor stores content resulting from the security-related operation in the write-only memory.

Figure 5:
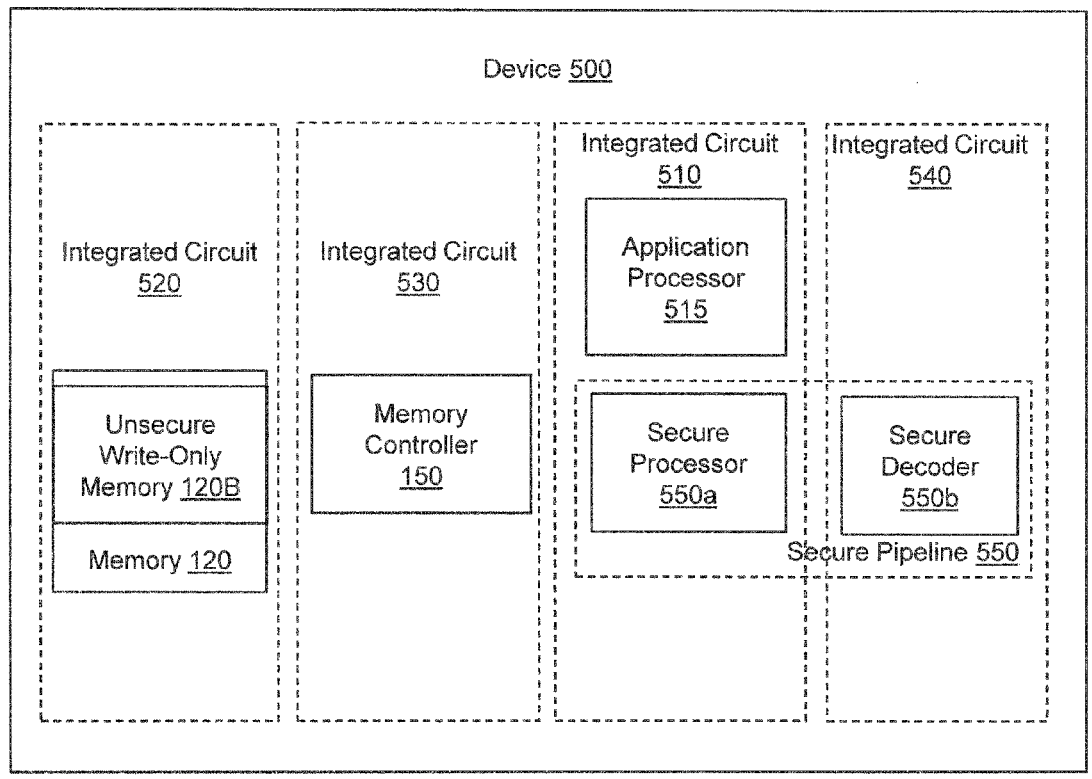
FIG. 5 illustrates one embodiment of a device associated with a secure content pipeline.

With reference to FIG. 5, one embodiment of device 500 is shown that is associated with a secure content pipeline. The device 500 may be a system-on-chip and includes several integrated circuits. An integrated circuit 510 includes an application processor 515 that is an unsecure processor. The integrated circuit 510 also includes a secure processor 550a. An integrated circuit 520 includes the memory 120, which includes the write-only memory 120B. An integrated circuit 530 includes the memory controller 150. An integrated circuit 540 includes a secure decoder 550b. The secure processor 550a and secure decoder 550b together create a secure pipeline 550.

The application processor 515 is configured to download encrypted digital content from a source and store the encrypted digital content in write-only memory. The memory controller 150 is configured to i) allow the application processor 515 to write the encrypted digital content to the write-only memory, ii) prevent the application processor 515 from reading data from the write-only memory, and iii) allow the secure processor 550a to read the encrypted digital content from the write-only memory. The secure processor 550a is configured to i) read the encrypted digital content from the write-only memory and ii) decrypt the encrypted digital content to produce decrypted digital content. In one embodiment, the secure processor 550a is configured to store the decrypted digital content in the write-only memory 120B. The secure decoder 550b is configured to decode the decrypted digital content for streaming.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory computer-readable medium, and/or combinations of each to perform a function(s) or an action(s), and/or to cause a function or action from another logic, method, and/or system. Logic may include a microprocessor programmed to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   a first processor;
   a second processor;
   first memory accessible to the first processor for writing data, wherein the first memory is not accessible to the first processor for reading data; and wherein the first memory is accessible to the second processor for both reading and writing data.

2. The apparatus of claim 1, further comprising a memory controller configured to i) allow the first processor to write data to the first memory and ii) prevent the first processor from reading data from the first memory.

3. The apparatus of claim 1, wherein the first processor is an unsecure processor configured to run software regardless of a source of the software.

4. The apparatus of claim 1, further comprising:
unsecure memory accessible to the first processor for writing and reading data.

5. The apparatus of claim 1, further comprising a memory controller configured to i) allow the second processor to write data to the first memory and ii) allow the second processor to read data from the first memory.

6. The apparatus of claim 1, wherein the second processor is a secure processor configured to i) run software from a trusted source and ii) not run software that is not from a trusted source.

7. The apparatus of claim 6, wherein the secure processor is configured to perform a security-related operation on data written to the first memory.

8. The apparatus of claim 7, wherein the secure processor is configured to store data resulting from the security-related operation in the first memory.

9. A method, comprising:
receiving first data to be written to a first memory from a first processor;
writing the first data to the first memory;
preventing read access to the first memory by the first processor;
receiving a request from a second processor to read the first data in the first memory; and
granting the request from the second processor to read the first data;
receiving second data to be written to the first memory from the second processor;
writing the second data to the first memory.

10. The method of claim 9, wherein the data is received from an unsecure processor configured to run software regardless of a source of the software.

11. The method of claim 9, where the request from the second processor is received from a secure processor configured to i) run software from a trusted source and ii) not run software that is not from a trusted source.

12. The method of claim 9, wherein the data comprises data downloaded by the first processor that requires performance of a security-related operation by a second processor.

13. The method of claim 12, further comprising granting a request from the second processor to store data resulting from the security-related operation in the first memory.

14. A device comprising:
first memory;
an application processor configured to i) download encrypted digital content from a source and ii) write the encrypted digital content in first memory;
a secure processor configured to i) read the encrypted digital content from the first memory, a ii) decrypt the encrypted digital content to produce decrypted digital content, and iii) write the decrypted digital content in the first memory; and
a memory controller configured to i) allow the application processor to write encrypted digital content to the first memory, ii) prevent the application processor from reading data from the first memory, and iii) allow the secure processor to read the encrypted digital content from the first memory and write the decrypted digital content in the first memory.

15. The device of claim 14, wherein the secure processor is configured to i) run software from a trusted source and ii) not run software that is not from a trusted source.

16. The device of claim 14, comprising a secure pipeline that includes the secure processor.

17. The device of claim 16, wherein the secure pipeline comprises a secure decoder that decodes the decrypted digital content for streaming.

* * * * *